United States Patent [19]

Igarashi et al.

[11] Patent Number: 4,503,189

[45] Date of Patent: Mar. 5, 1985

[54] ADHESIVE COMPOSITIONS

[75] Inventors: Sachio Igarashi, Suita; Kyuya Yamazaki, Ibaraki, both of Japan

[73] Assignee: Takeda Chemical Industries, Ltd., Osaka, Japan

[21] Appl. No.: 564,080

[22] Filed: Dec. 20, 1983

[30] Foreign Application Priority Data

Dec. 21, 1982 [JP] Japan ............................. 57-225330

[51] Int. Cl.$^3$ ..................... C08L 9/02; C08L 27/06; C08L 67/00; C08L 83/00

[52] U.S. Cl. ............................. 525/104; 525/105; 525/125

[58] Field of Search ............... 525/104, 105, 445, 440, 525/125

[56] References Cited

U.S. PATENT DOCUMENTS 3,969,306 7/1976 Borman et al. .................... 525/445
4,206,299 6/1980 Yamazaki et al. .................. 528/288

FOREIGN PATENT DOCUMENTS 29948 6/1981 European Pat. Off. ........... 525/445

*Primary Examiner*—Allan M. Lieberman
*Attorney, Agent, or Firm*—Wenderoth, Lind & Ponack

[57] ABSTRACT

Adhesive compositions, which comprise (A) a polyester polyol, polyester polyurethane polyol or their mixture, (B) a silane coupling agent, (C) a vinyl-chloride copolymerization resin, (D) a diene synthetic rubber and (E) an organic polyisocyanate.

The adhesive compositions can be used as adhesives for plastic films, such as nylon, tetron and polyolefins, aluminum foil, etc., and offers particularly excellent adhesion toward metallized films, whereby the resultant bonded films, even when boiled in an alkali or acid atmosphere, remain free from discoloration or disappearance in the metallized layers.

5 Claims, No Drawings

ADHESIVE COMPOSITIONS

The present invention relates to adhesive compositions, and particularly to adhesive compositions which are useful for bonding metallized films to themselves.

Metallized films are produced by the vacuum metallizing process. The principle of the vacuum metallizing process lies in heating an arbitrary metal (e.g., aluminum, nickel, chromium or alloys thereof, etc.) in a high vacuum equipment in the neighborhood of $10^{-4}$ Torr at temperatures higher than its melting point to cause the metal to vaporize, radiating and condensing the metal in the state of atoms or molecules on a cooled substrate plate to be metallized such as into plastic films, thereby forming polycrystal thin layers.

The metallized films thus produced find widened application in decorative materials, electrical industry, agriculture, packaging systems, etc.

As the characteristic features that the metallized film can offer, there may be mentioned, for example, (1) imparted beautiful metal gloss, (2) an improved barrier property against gases, steam, etc., (3) a reduced pinhole formation as compared with aluminum foil, (4) a decreased thickness of 1/100 to 1/200 of that of aluminum foil, thus making possible reduction in weight and saving of natural resources, and (5) an increased flexural strength owing to the metal supported onto plastic film.

Principal uses of the metallized film include the areas of gold thread and silver thread. Such kinds of thread are manufactured by bonding by an adhesive two metallized films to each other with their film surfaces exposed, subjecting to the coloring step and the after-treatment step, and slitting into filaments, which are then wound up to a reel while twisting rayon, silk, etc. Such gold thread and silver thread are widely used in kimono dress, obi belting, suits, blouses, neckties, edges of tatami mat, etc.

Since acids, alkalis, high-pressure hot water, etc. are employed in the coloring and after-treatment steps following the bonding of two metallized films to each other, the adhesive used must protect the metal deposited layers under such severe conditions. Aluminum, which is used almost exclusively as the deposited metal in the present uses, is an amphoteric metal per se and shows inferior acid and alkali resistances. The plastic films provided with aluminum metallized layer being bonded to each other by use of a conventionally known adhesive, when exposed to the above severe conditions, for example by boiling in an aqueous alkali solution with a pH in the neighborhood of 11, demonstrate decreased metal gloss because the metallized layers are corroded for a short period of time, and in an extreme case, come to lose the metallized layers. Therefore, the metallized films are currently produced through the two steps of forming a special coating film layer on the metallized layer and then bonding together with an adhesive.

The present inventors, after extensive investigation into such an adhesive as may provide adequate protection to the aluminum metallized layer by one step of merely bonding together without applying a special coating layer on the metallized layer, found that a composition consisting of a mixture of a polyester polyol, polyester polyurethane polyol or their mixture, a silane coupling agent and an organic polyisocyanate being admixed with a vinyl-chloride copolymerization resin and a diene synthetic rubber exhibits improved acid resistance, alkali resistance and high-temperature hot water resistance, which has culminated into the present invention.

Thus, the present invention relates to adhesive compositions which comprise (A) a polyester polyol, polyester polyurethane polyol or their mixture, (B) a silane coupling agent, (C) a vinyl-chloride copolymerization resin, (D) a diene synthetic rubber and (E) an organic polyisocyanate.

Examples of the polyester polyol, the component (A), which is useful in the present invention include polyester polyols having hydroxyl groups at both of their terminals and a molecular weight of 3,000 to 100,000, preferably 10,000 to 50,000, as obtained by reacting dibasic acids, such as terephthalic acid, phthalic acid, isophthalic acid, adipic acid and sebacic acid, their dialkyl esters or their mixtures with glycols, such as ethylene glycol, propylene glycol, butylene glycol, diethylene glycol and neopentyl glycol, triols, such as trimethylolethane, trimethylolpropane, hexanetriol, glycerol, pentaerythritol, tris(hydroxyethyl)isocyanurate and quadrol, tetraols or their mixtures. Among the above polyester polyols, polyester glycols are particularly preferred. In producing the polyester polyols, use can be made of esterification or ester exchange reaction catalyst or polymerization catalysts normally employed to promote the reaction, such as antimony dioxide, zinc acetate, lead acetate and manganese acetate.

Also, epoxy resins can be added to the polyester polyols. When an epoxy resin is added, its amount to be added is suitably in an amount 0 to 30 weight % relative the component (A). Examples of the epoxy resin include reaction products of polyhydric phenols, such as bisphenol A and tetrahydroxydiphenylethane, and polyfunctional halohydrins, such as epichlorohydrin and glycidol.

The polyester polyurethane polyol, the component (A), is obtained for example by formulating a polyester polyol, particularly a polyester glycol, an organic diisocyanate and further a low-molecular-weight glycol if necessary in such a proportion that the NCO/OH ratio may be 0.7 to 1.0 and allowing then to react. The reaction may be conducted by mixing 1 mole of a polyester glycol with 0.7 to 1.0 mole of an organic diisocyanate, by mixing a polyester glycol with a low-molecular-weight glycol at a given molar ratio and adding an organic diisocyanate in such an amount that the NCO/OH ratio may be 0.7 to 1.0, and further by reacting a polyester glycol or a mixture of a polyester glycol and a low-molecular-weight glycol with an organic diisocyanate at a molar ratio of NCO/OH $\geq$ 1 to produce a prepolymer having isocyanate groups at its terminals, which is then reacted with a low-molecular-weight glycol, low-molecular-weight polyol or epoxy resin at an OH/excessive NCO of 2 to 20, preferably 4 to 10.

The polyester glycol to be used in the above reaction is a linear polyester having hydroxyl groups at both of its terminals obtained by the reaction of the dibasic acids and glycols as mentioned above, and preferred use is made of such linear polyesters having a molecular weight of 500 to 10,000, particularly 500 to 3,000.

As examples of the organic diisocyanate, there may be mentioned aliphatic diisocyanates being exemplified by trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate, etc., alicyclic diisocyanates being exemplified by 1,3-cyclopentanediisocyanate, 1,4-cyclohexanediisocyanate, 1,3-cyclohexanediisocyanate, 3-isocyanatomethyl-3,5,5-trimethylcyclohexyl isocyanate (isophorone diisocyanate), 4,4'-methylenebis(cyclohexylisocyanate), methyl-2,4-cyclohexanediisocyanate, methyl-2,6-cyclohexanediisocyanate, 1,4-bis(isocyanatomethyl)cyclohexane, 1,3-bis(isocyanatomethyl)cyclohexane, etc., aromatic diisocyanates being exemplified by m-phenylene diisocyanate, p-phenylene diisocyanate, 4,4'-diphenyl diisocyanate, 1,5-naphthalenediisocyanate, 4,4'-diphenylmethanediisocyanate, 2,4- or 2,6-tolylene diisocyanate or mixture thereof, 4,4'-toluidinediisocyanate, dianisidinediisocyanate, 4,4'-diphenyl ether diisocyanate, etc., aralkyl diisocyanates being exemplified by 1,3- or 1,4-xylylene diisocyanate or mixture thereof, ω,ω'-diisocyanate-1,4-diethylbenzene and the like.

As the low-molecular-weight polyol, polyols having not less than 2, preferably 2 to 8 hydroxyl groups, in the molecule and a molecular weight of normally not more than 400, particularly 60 to 400, are preferred, and there may be mentioned, by way of example, diols such as ethylene glycol, diethylene glycol, 1,4-butanediol and 1,6-hexaneglycol, triols such as glycerol, trimethylolpropane and 1,2,6-hexanetriol, and polyols not less than tetraols such as pentaerythritol, methylglycoside, xylitol, sorbitol and sucrose.

Each of the above reactions for producing the polyester polyurethane polyols is conducted normally at a reaction temperature of 50° to 100° C., and may be carried out in the presence of, or in the absence of, an organic solvent inert to isocyanate group as described later. If desired, conventional urethane reaction catalysts, organic tin compounds, tertiary amines, etc. may be used. In cases in which the production steps are conducted in practice in the presence of an organic solvent, when the organic solvent is employed in such an amount as the concentration of the final reaction mixture may be about 10 to 90 weight %, preferably 20 to 80 weight %, the above mentioned polyester polyol and polyester polyurethane polyol can be mixed at any ratio and used.

The silane coupling agent (B) which is useful in the present invention may be any of the compounds being represented by the structural formulae R—Si≡(X)$_3$ or R—Si≡(R')(X)$_2$ (wherein R is an organic group having a vinyl, epoxy, amino, substituted amino or mercapto group; R' is a lower alkyl group; X is methoxy, ethoxy or chlorine), and examples of such compounds include chlorosilanes such as vinyltrichlorosilane, aminosilanes such as N-(dimethoxymethylsilylpropyl)ethylenediamine, aminopropyltriethoxysilane, N-(trimethoxysilylpropyl)ethylenediamine and N-(triethoxysilylpropyl)ethylenediamine, epoxysilanes such as γ-glycidoxypropyltrimethoxysilane and β-(3,4-epoxycyclohexyl)ethyltrimethoxysilane, vinylsilanes such as vinyltriethoxysilane and vinyltris(β-methoxyethoxy)silane, and mercaptosilanes such as γ-mercaptopropyltrimethoxysilane. The silane coupling agent serves the particular purpose of enhancing the bonding strength with the metallized layer and also improving hot water resistance.

With reference to the addition method for the silane coupling agent, it may be mixed with the polyester polyol at the beginning of the urethane reaction to conduct the reaction, or it may be added during the urethane reaction or after the completion of the reaction. The amount of the silane coupling agent based upon component (A) is in the range of about 0.05 to 30 weight %, preferably about 0.1 to 10 weight %, provided, however, that when a silane coupling agent having a hydroxyl group active to the isocyanate group is added at the beginning of, or in the course of the reaction, the urethane reaction in the production step for the component (A), the reaction must be carried out by taking into account the active hydroxyl group of the silane coupling agent so that NCO/(OH+active hydrogen) may be 0.7 to 1.0.

The vinyl-chloride copolymerization resin (C), which is useful in the present invention, denotes copolymerization resins composed mainly of vinyl chloride and vinyl acetate. It may be copolymers from vinyl alcohol, maleic anhydride, etc. as well as vinyl chloride and vinyl acetate; it may be any of copolymers, only if their composition falls under the ranges of about 70 to 92 mole % of vinyl chloride, about 1 to 30 mole % of vinyl acetate, about 0 to 10 mole % of vinyl alcohol and about 0 to 10 mole % of maleic acid. Especially, those containing maleic acid are preferred. Their molecular weights are in the range of about 10,000 to 50,000, preferably about 15,000 to 40,000. The addition ratio of the vinyl-chloride copolymerization resin (C) to the component (A) is in the range of about 5 to 40 weight %, preferably about 10 to 30 weight %. When the addition ratio is less than 5 weight %, it occurs in some instances that the bonding strength decreases or the acid, alkali and heat resistance deteriorates. When it is beyond 40 weight %, it occurs in some instances that the bonding strength decreases or the heat resistance deteriorates.

As the diene synthetic rubber (D) which is useful in the present invention, there may be mentioned, for example, chlorinated rubber, homopolymers of butadiene, isoprene, isobutylene, chloroprene etc., or copolymers from butadiene, isoprene, etc. with acrylonitrile, styrene, etc. Also, such component (D) may be, for example, polybutadiene and polyisoprene having their terminals converted into hydroxyl, carboxyl, epoxy and other groups. Their appearance may be either liquid or solid but the aqueous emulsion form is not preferred, because the water contained therein reacts with the organic polyisocyanate (E).

The amount of the diene synthetic rubber (D) relative to component (A) is in the range of about 5 to 40 weight %, preferably about 10 to 30 weight %, When the addition ratio is less than 5 weight %, the acid, alkali and heat resistance deteriorates, and in the case of the addition ratio of beyond 40 weight %, it takes place in some instances that the bonding strength decreases or the alkali and heat resistance deteriorates.

As the organic polyisocyanate (E), by way of example, there may be mentioned polyisocyanate monomers such as organic diisocyanates employed as raw material for the component (A); organic triisocyanates being exemplified by triphenylmethane-4,4'-4''-triisocyanate, 1,3,5-triisocyanatobenzene, 2,4,6-triisocyanatotoluene, etc., and organic tetraisocyanates being exemplified by 4,4'-diphenyldimethylmethane-2,2'-5,5'-tetraisocyanate; dimers and trimers derived from the above polyisocyanate monomers and polyurethane polyisocyanates obtained by the reaction of such polyisocyanate monomers with low-molecular-weight polyols utilized likewise as raw material for the component (A), and the like.

The NCO/OH in the reaction between the polyisocyanate monomer and the low-molecular-weight polyol may be not less than 1.5 equivalents, and normally ranges from 1.5 to 10, preferably from 1.7 to 5. This reaction can be conducted normally at about 30° to 100° C., in the presence of, or in the absence of, a solvent inert to isocyanate group as described later, but it in some instances is convenient to carry out the reaction in the presence of such solvent. In conducting the reaction, if desired, organic metal or tertiary amine catalysts may be added, the reaction temperature may be raised to form the allophanate bonds, or a small amount of water or amines (e.g., ethylenediamine, hexamethylenediamine, etc) may be added to form the biuret bonds. When a solvent inert to isocyanate group is used, it is convenient to adjust the solid content of the resulting polyurethane polyisocyanate solution to a range of about 50 to 90 weight %.

The adhesive composition according to the present invention is produced by mixing the above-mentioned (A) polyester polyol, polyester polyurethane polyol or their mixture, (B) silane coupling agent, (C) vinyl-chloride copolymerization resin, (D) diene synthetic rubber and (E) organic polyisocyanate in such proportions that the molar equivalent ratio of NCO equivalents from polyisocyanate (EO to the active hydrogen equivalents from the sum of (A), (B), (C) and (D) may be in the range of about 1 to 10, preferably about 2 to 6.

When the composition obtained by mixing the above components (A) through (E) is highly viscous, dilution may be effected with organic solvents, such as ketones exemplified by acetone, methyl ethyl ketone and methyl isobutyl ketone, esters typified by ethyl acetate, butyl acetate and 2-ethoxyethyl acetate, aromatics exemplified by toluene and xylene and ethers typified by dioxane and tetrahydrofuran. The composition normally exhibits a solid content in the range of about 20 to 80 weight %.

In conducting a bonding treatment with the use of the adhesive composition according to the present invention, the conventionally employed methods, such as the method which comprises allowing the composition to adhere to the surface of a film by a dry laminator, etc., evaporating a solvent if used, mating the surfaces to be bonded and curing the composition at ordinary temperature or under heating, are adopted.

The coating amount is normally in the range of about 2 to 6 g/m$^2$.

The adhesive composition according to the present invention can be used as an adhesive for films of plastics, such as nylon, tetron and polyolefins, aluminum foil, etc., and offers particularly excellent adhesion toward metallized films, whereby the resultant bonded films, even when boiled in an alkali or acid atmosphere, remain free from discoloration or disappearance in the metallized layers.

The examples are described below to illustrate the present invention more specifically.

EXAMPLE (1) A polyester glycol of about 20,000 in molecular weight being composed of dimethyl terephthalate/sebacic acid=1/1 (molar ratio); ethylene glycol/1,4-butylene glycol=1/1 (molar ratio) was synthesized, and 100 g of the resultant polyester glycol was dissolved in 100 g of a 1/1 (weight ratio) solvent mixture of toluene/methyl ethyl ketone (composition I).

(2) A mixture of 215 g of a polyester glycol (molecular weight of 2150: dimethyl terephthalate/sebacic acid=1/1 molar ratio, ethylene glycol/1,4-butylene glycol=1/1 molar ratio), 17.4 g of tolylene diisocyanate (2,4-/2,6-isomers=80/20), 240.6 g of a 1/1 mixture of methyl ethyl ketone/toluene and 0.05 g of dibutyltin dilaurate as a catalyst was allowed to react at 60° C. for 4 hours, to which was added 3.5 g of trimethylolpropane, followed by allowing the whole mixture to react for 2 hours. By this procedure, there was obtained a polyurethane polyol with a solid content of 50 weight % (composition II).

(3) A mixture of 950 g of a polyester glycol (molecular weight of 1900: dimethyl terephthalate/sebacic acid=1/1 molar ratio, ethylene glycol/1,4-butylene glycol=1/1 molar ratio, 111.2 g of isophorone diisocyanate, 1079 g of a 1/1 (weight ratio) solvent mixture of methyl ethyl ketone/toluene and 0.2 g of dibutyltin dilaurate as a catalyst was allowed to react at 70° C. for 8 hours, to which was added 17.9 g of trimethylolpropane, followed by allowing the whole mixture to react for 2 hours. By this procedure, there was obtained a polyurethane polyol with a solid content of 50 weight % (composition III).

(4) A mixture of 174.2 g of tolylene diisocyanate and 73.0 g of ethyl acetate was heated at 65° C., and 44.7 g of trimethylolpropane was gradually added, followed by allowing the reaction to proceed for 3 hours to give a polyurethane polyisocyanate with a solid content of 75 weight % and an NCO content of 14.4 weight % (composition IV).

(5) A mixture of 222.3 g of isophorone diisocyanate and 89.0 g of ethyl acetate was heated to 65° C., and 44.7 g of trimethylolpropane was gradually added, followed by allowing the reaction to proceed for 5 hours to give a polyurethane polyisocyanate with a solid content of 75 weight % and an NCO content of 11.8 weight % (composition V).

The polyester glycol (composition I) and polyester polyurethane polyols (compositions II and III) thus prepared were combined with the silane coupling agents, vinyl-chloride compolymerization resins and synthetic rubbers to be described in the Table 1 below as well as the polyisocyanates (compositions IV and V) to prepare compositions for adhesive 1 through 12 as shown in Table 1. For the purpose of comparison with the compositions 1 through 12, adhesives 13 through 17 were also prepared without addition of the silane coupling agent, vinyl-chloride copolymerization resin and synthetic rubber. With these compositions, tests on the bonding strength with the metallized film, acid resistance, alkali resistance, hot water resistance and oil resistance were carried out. The results are illustrated in Table 2.

TABLE 1

| Adhesive composition No. | Polyester glycol (A) I | Polyester polyurethane polyol (A) II | Polyester polyurethane polyol (A) III | Organic polyisocyanate (E) IV | Organic polyisocyanate (E) V | Silane coupling agent (B) a | Silane coupling agent (B) b | Vinyl-chloride copolymerization resin (C) a | Vinyl-chloride copolymerization resin (C) b | Diene synthetic rubber (D) a | Diene synthetic rubber (D) b | Methyl ethyl ketone | Toluene | NCO/OH ratio |
|---|---|---|---|---|---|---|---|---|---|---|---|---|---|---|
| The present invention | | | | | | | | | | | | | | |
| 1 | 100 | | | 10 | | 1 | | 20 | | 10 | | 50 | 15 | 3.7 |

TABLE 1-continued

| Adhesive composition No. | Polyester glycol (A) I | Polyester polyurethane polyol (A) II | Polyester polyurethane polyol (A) III | Organic polyisocyanate (E) IV | Organic polyisocyanate (E) V | Silane coupling agent (B) a | Silane coupling agent (B) b | Vinyl-chloride copolymerization resin (C) a | Vinyl-chloride copolymerization resin (C) b | Diene synthetic rubber (D) a | Diene synthetic rubber (D) b | Methyl ethyl ketone | Toluene | NCO/OH ratio |
|---|---|---|---|---|---|---|---|---|---|---|---|---|---|---|
| 2 | 100 | | | 20 | | 1 | | 20 | | | 10 | 50 | 15 | 3.6 |
| 3 | 100 | | | 20 | | | 1 | | 20 | 10 | | 50 | 15 | 2.4 |
| 4 | | 100 | | 20 | | 1 | | 20 | | 10 | | 50 | 15 | 3.3 |
| 5 | | 100 | | 20 | | 1 | | 20 | | | 10 | 50 | 15 | 2.2 |
| 6 | | 100 | | 30 | | | 1 | | 20 | 10 | | 50 | 15 | 2.5 |
| 7 | | | 100 | | 30 | 1 | | 20 | | 10 | | 50 | 15 | 3.7 |
| 8 | | | 100 | | 30 | 1 | | 20 | | | 10 | 50 | 15 | 2.6 |
| 9 | | | 100 | | 30 | | 1 | | 20 | 10 | | 50 | 15 | 2.0 |
| 10 | 50 | 50 | | 10 | | 0.5 | | 15 | | 10 | | 50 | 15 | 2.7 |
| 11 | 50 | 50 | | 20 | | 2 | | 15 | | 10 | | 50 | 15 | 3.6 |
| 12 | | 100 | | 20 | | 1 | | 20 | | 8 | | 50 | 15 | 3.3 |
| Comparative example | | | | | | | | | | | | | | |
| 13 | 100 | | | 10 | | 1 | | | | | | | | 3.7 |
| 14 | 100 | | | 10 | | 1 | | 20 | | | | 50 | 15 | 3.7 |
| 15 | 100 | | | 10 | | 1 | | | | 10 | | | | 3.7 |
| 16 | 100 | | | 10 | | | | 20 | | 10 | | 50 | 15 | 3.7 |
| 17 | | 100 | | 10 | | | | 20 | | | | 50 | 15 | 2.1 |

Note:
Silane coupling agent;
a γ-Glycidoxypropyltrimethoxysilane
b N—(trimethoxysilylpropyl)ethylenediamine
Vinyl-chloride copolymerization resin;
a A resin composed of vinyl chloride/vinyl acetate/maleic anhydride = 86/13/1 (molar ratio)
b A resin composed of vinyl chloride/vinyl acetate/vinyl alcohol = 91/3/6 (molar ratio)
Diene synthetic rubber;
a A liquid rubber of acrylonitrile/butadiene copolymer
b Polybutadienediol (molecular weight of 2000).

The vinyl chloride copolymerization resins, which do not dissolve merely be mixing, were heated and dissolved in advance in a solvent mixture of methyl ethyl ketone/toluene, and added to other components on the occasion of use.

Test conditions 1

Substrate;
Aluminum metallized polyethylene terephthalate (thickness of 12μ).
Coating amount of adhesives;
3 to 4 g/m²
Curing conditions;
45° C., 3 days
Test samples;
Each of adhesives as illustrated in Table 1.
A composition was applied on the aluminum metallized surface of aluminum metallized polyethylene terephthalate by a dry laminator, and after evaporation of the solvent, the face to be bonded was mated onto the aluminum metallized surface of another aluminum metallized polyethylene terephthalate film. Subsequently, the composition was cured, and tests as shown in Table 2 were conducted.

| Adhesive composition | Peel strength[a] (average value) | Alkali resistance test[b] | Acid resistance test[c] | High-pressure hot water test[d] |
|---|---|---|---|---|
| The present invention | | | | |
| 1 | 210 | Good | Good | Good |
| 2 | 190 | " | " | " |
| 3 | 240 | " | " | " |
| 4 | 270 | " | " | " |
| 5 | 250 | " | " | " |
| 6 | 250 | " | " | " |
| 7 | 240 | " | " | " |
| 8 | 220 | " | " | " |
| 9 | 260 | " | " | " |
| 10 | 210 | " | " | " |
| 11 | 190 | " | " | " |
| 12 | 220 | " | " | " |
| Comparative example | | | | |
| 13 | 100 | Corroded | Corroded | Corroded |
| 14 | 120 | " | Good | " |
| 15 | 110 | " | " | " |
| 16 | 120 | " | " | Good |
| 17 | 130 | " | " | Corroded |

Note:
[a] A test specimen was cut into a size of 200 mm × 15 mm, and a T peel test was effected with a tensile testing machine at a tensile rate of 300 mm/min in accordance with the testing method of ASTM D1876-61. The peel strength (g/15 mm) was expressed in terms of the average value for 10 test specimens.
[b] Alkali resistance test.
A test specimen was cut into 1 mm wide pieces by a knife, and such pieces were boiled in a 0.16% aqueous Na₂CO₃ solution at 100° C. for 60 minutes.
[c] Acid resistance test
A test specimen was cut into 1 mm wide pieces with a knife, and such pieces were boiled in a 0.2% aqueous CH₃COOH solution at 100° C. for 120 minutes.
[d] High-pressure hot water test.
A test specimen was cut into pieces of 1 mm × 100 mm, which were immersed in high-pressure hot water at 130° C. for 60 minutes.

What is claimed is:
1. An adhesive composition which comprises (A) a polyester polyol, a polyester polyurethane polyol, or a mixture of said polyols, said polyols each having a molecular weight of 3,000 to 100,000, (B) a silane coupling agent in an amount of about 0.05 to 30 weight %, based on component (A), said silane coupling agent (B) being one represented by the structural formulae R—Si≡(X)₃ or R—Si≡(R')(X₂) wherein R is an organic group having a vinyl, epoxy, amino, a substituted amino or a mercapto group; R' is a lower alkyl group; and X is methoxy, ethoxy or chlorine, (C) a vinyl-chloride copolymerization resin in an amount of about 5–40 weight %, based on component (A), said vinyl chloride polymerization resin being composed mainly of vinyl chloride and vinyl acetate and having a molecular weight in the range of about 10,000 to 50,000, (D) a diene synthetic rubber in an amount of about 5–50 weight %, based on component (A), and (E) an organic polyisocyanate wherein the quantity of polyisocyanate (E) is such that the molar equivalent ratio of NCO equivalents from polyisocyanate (E) to the active hydrogen equivalents from the sum of (A), (B), (C) and (D) is in the range of about 1 to 10.

2. An adhesive composition claimed in claim 1, wherein the polyester polyol of the component (A) is a polyester glycol.

3. An adhesive composition claimed in claim 1, wherein the polyester polyurethane polyol of the component (A) is one obtained by the reaction of a polyester glycol, an organic diisocyanate and a low-molecular-weight polyol.

4. An adhesive composition claimed in claim 1, wherein the diene synthetic rubber (D) is a copolymer from butadiene with acrylonitrile.

5. An adhesive composition claimed in claim 1, wherein the organic polyisocyanate (E) is a polyurethane polyisocyanate obtained by the reaction of a polyisocyanate with a low-molecular-weight polyol.

* * * * *